(12) United States Patent
Bowie (10) Patent No.: US 9,476,522 B2
(45) Date of Patent: Oct. 25, 2016

(54) PIPE SEALING

(75) Inventor: Angus George Bowie, Aberdeen (GB)

(73) Assignee: STATS (UK) Limited, Aberdeenshire (GB)

( * ) Notice: Subject to any disclaimer, the term of this patent is extended or adjusted under 35 U.S.C. 154(b) by 605 days.

(21) Appl. No.: 13/398,022

(22) Filed: Feb. 16, 2012

(65) Prior Publication Data

US 2012/0211113 A1 Aug. 23, 2012

(30) Foreign Application Priority Data

Feb. 17, 2011 (GB) .................................. 1102784.4

(51) Int. Cl.
- *F16L 55/16* (2006.01)
- *F16L 1/26* (2006.01)
- *F16L 55/17* (2006.01)

(52) U.S. Cl.
CPC .................. *F16L 1/26* (2013.01); *F16L 55/17* (2013.01); *Y10T 29/49826* (2015.01)

(58) Field of Classification Search
CPC ..... F16L 55/168; F16L 55/17; F16L 55/172; F16L 55/178
USPC ..................................................... 138/97, 99
See application file for complete search history.

(56) References Cited

U.S. PATENT DOCUMENTS

| | | | | |
|---|---|---|---|---|
| 98,893 A | * | 1/1870 | Street ............................... | 138/99 |
| 2,009,046 A | * | 7/1935 | Fons ................................ | 138/99 |
| 2,713,352 A | * | 7/1955 | Schustack ............... | F16L 21/06 138/99 |
| 2,826,799 A | * | 3/1958 | Schustack ............. | F16L 55/172 138/99 |
| 3,371,521 A | * | 3/1968 | Hauk ................. | 73/46 |
| 3,744,822 A | * | 7/1973 | Arnold ........................... | 285/18 |
| 3,954,288 A | | 5/1976 | Smith | |
| 4,111,234 A | | 9/1978 | Wells et al. | |
| 4,185,492 A | | 1/1980 | Hauk et al. | |
| 4,244,208 A | * | 1/1981 | Hauk et al. ....................... | 73/46 |
| 4,465,310 A | * | 8/1984 | Archer .......................... | 285/373 |
| 4,643,466 A | | 2/1987 | Conner et al. | |
| 4,673,122 A | | 6/1987 | Dubey | |
| 5,004,275 A | * | 4/1991 | Miller ..................... | F16L 55/17 138/99 |
| 5,358,286 A | | 10/1994 | Eaton et al. | |

(Continued)

FOREIGN PATENT DOCUMENTS

| CN | 201407451 | 2/2010 |
|---|---|---|
| EP | 0697552 A2 | 2/1996 |

(Continued)

OTHER PUBLICATIONS

United Kingdom Search Report for GB Application No. GB1202725.6 dated Jun. 6, 2012.

(Continued)

*Primary Examiner* — James Hook
(74) *Attorney, Agent, or Firm* — Carlson, Gaskey & Olds, P.C.

(57) ABSTRACT

A sealing apparatus suitable for use as a subsea repair clamp includes a sealing membrane with first and second portions for engaging an outer surface of a pipe. Retaining members are located in opposing relationship to each other about the sealing membrane and are secured to each other by a closure member. The retaining members retain sealing engagement between the sealing membrane and the pipe. Each of the retaining members can include axially spaced plates arranged generally transversely to a longitudinal axis of the sealing membrane.

21 Claims, 3 Drawing Sheets

(56) References Cited

U.S. PATENT DOCUMENTS

| | | | |
|---|---|---|---|
| 5,437,489 A * | 8/1995 | Sanders et al. | 294/198 |
| 5,605,357 A | 2/1997 | Bird | |
| 5,711,639 A * | 1/1998 | Tessier et al. | 405/171 |
| 5,950,683 A | 9/1999 | Henderson et al. | |
| 6,675,836 B1 * | 1/2004 | Gaston | F16L 55/17 138/97 |
| 6,883,835 B2 * | 4/2005 | Krout et al. | 285/15 |
| 7,165,579 B2 * | 1/2007 | Borland et al. | 138/99 |
| 7,232,160 B2 | 6/2007 | Krausz et al. | |
| 2006/0220375 A1 | 10/2006 | Tisch | |
| 2010/0313625 A1 | 12/2010 | Green | |
| 2012/0325357 A1 * | 12/2012 | Vu | 138/97 |

FOREIGN PATENT DOCUMENTS

| | | |
|---|---|---|
| EP | 1380789 A1 | 1/2004 |
| ES | 2116822 B1 | 3/1999 |
| GB | 2171483 A | 8/1986 |
| GB | 2191837 A | 12/1987 |
| GB | 2355293 A | 4/2001 |
| GB | 2355293 B | 3/2004 |
| GB | 2416013 A | 1/2006 |
| GB | 2450119 A | 12/2008 |
| GB | 2480131 A | 11/2011 |
| GB | 2480131 B | 4/2012 |
| WO | 2010/080041 A1 | 7/2010 |

OTHER PUBLICATIONS

European Search Report for EP Application No. EP12250034 dated Apr. 23, 2012.

* cited by examiner

PIPE SEALING

REFERENCE TO RELATED APPLICATION

This application claims priority to United Kingdom Application No. GB 1102784.4 filed Feb. 17, 2011.

FIELD OF THE INVENTION

This invention relates to pipe sealing and, in particular, but not exclusively, to an apparatus and method for sealing a damaged section, defect or penetration in a subsea pipe, pipeline or the like.

BACKGROUND TO THE INVENTION

In many industries, pipes or pipelines are utilized to transport fluid over distance. For example, in the oil and gas industry, there is a need to transport fluid over great distances, often over largely inaccessible terrain, in deep water, or in other subsea environments.

In the event of damage to a section of pipe, the importance of sealing the pipe in order to obviate or mitigate loss of fluid will be readily understood.

One repair option involves installing a repair clamp on the pipe outer diameter. Traditionally, this may take the form of a split sleeve bolted clamp with compression flanges at either end to provide a seal to the pipe outer diameter. A taper lock grip may optionally be provided often using the same compression flanges.

As many subsea pipelines are of relatively large diameter and transport fluid at high pressure, repair clamps, such as described above, are typically large and heavy and involve materials and manufacturing processes which result in significant lead times.

Two traditional construction methods for the manufacture of repair clamps are ring forging and fabrication. Ring forging requires a very large billet of material, which typically requires significant machining. Both the materials sourcing and manufacture result in a significant lead time.

Fabricated clamps involve simpler manufacturing processes and may use more readily available materials such as plate and pipe. Nevertheless, fabricating a clamp involves large structural welds which must be capable of resisting the full separation load and maintaining the rigidity of the clamp. Large structural welds often result in a degree of distortion and require additional machining and post weld heat treatment processes to be carried out, such that fabricated clamps will also involve a significant lead time.

In addition, due to the inaccessibility of many subsea pipelines, remotely operated vehicles (ROV's) are required to deploy and operate the clamps. As such, consideration must be given during the design and manufacture of such clamps in order that they are suitable for ROV use. By way of example, when converting a split sleeve clamp for ROV operation, sacrificial bolt tensioners may be provided to operate the bolting, as a result of which a separate mechanism is required to lock in the bolt pre-tension and permit the hydraulic supply to be detached.

SUMMARY OF THE INVENTION

According to a first aspect of the present invention, there is provided a sealing apparatus for use in sealing a pipe. The apparatus includes a sealing membrane adapted to engage a pipe, first and second retaining members configured for location about the sealing membrane, and a closure member for securing the first and second retaining members together to retain sealing engagement between the sealing membrane and the pipe.

Each retaining member may include at least one plate, and in particular embodiments each retaining member may include a plurality of plates.

In use, the sealing membrane may be adapted for location about the outer surface of a section of a pipe, for example, a damaged section of pipe or pipe section having a defect or penetration. The retaining members may be positioned around the sealing membrane, in opposing relationship to each other. The sealing membrane may be configured to resist axial loads applied to the sealing membrane, for example, tensile and/or compressive forces generated by expansion and contraction of the pipe. The retaining members may be configured to resist radial loads applied to the sealing membrane, which may otherwise result in the loss of sealing integrity between the sealing membrane and the pipe.

Thus, an apparatus according to embodiments of the present invention may include retaining members configurable to provide a load resisting structure which is capable of maintaining sealing engagement between the sealing membrane and the pipe, but which does not require structural welding to the sealing membrane. Accordingly, lead times in manufacture of the apparatus may be significantly reduced in comparison to traditional clamp arrangements. In some embodiments, the retaining members may be secured to the sealing membrane by a securement, such as a small stitch weld or the like. However, the arrangement and construction of embodiments of the present invention may mean that the securement or weld may be of a relatively small size which does not generate distortion or require additional machining or heat treatment processes to be carried out, significantly reducing lead time. In addition, as the securement or weld does not need to support high loads, these being carried by the retaining members, securement may be provided rapidly, further reducing lead time. The sealing membrane may be of any suitable construction.

In particular embodiments, the sealing membrane may include a split collar having first and second sealing membrane portions. In use, the sealing membrane portions may be provided about the pipe in opposing relationship to each other.

The sealing membrane may be of any suitable shape to facilitate engagement with the pipe. For example, for circular cross section pipe, the sealing membrane may include a split cylinder having hemi-cylindrical sealing membrane portions.

The provision of a split collar arrangement facilitates location of the sealing membrane at any location along the length of the pipe without requiring a section of the pipe to be cut.

The sealing membrane may be comprised of any suitable material capable of facilitating sealing engagement with the pipe. In some embodiments, the sealing membrane may comprise a metallic material, alloy or the like. In other embodiments, the sealing membrane may comprise a non-metallic material including, for example, a plastic material, polymeric material, ceramic material or composite material.

The retaining members may be of any suitable construction and may be comprised of any suitable material. In particular embodiments, the plates may be arranged in a substantially transverse or perpendicular direction with respect to a longitudinal axis of the sealing membrane, which may also be the longitudinal axis of the pipe. Beneficially, a transverse plate arrangement gains the maximum strength from the plate structure as this provides for efficient transfer of forces from the pipe to the plates.

Each plate may be formed so as to directly engage with the sealing membrane. In particular embodiments, each plate may include a cut-out portion having an inner dimension, for example a radius, corresponding to an outer dimension, such as outside radius, of the sealing membrane. In use, internal pressure forces acting on the sealing membrane may thus be transferred directly to the plates. Accordingly, the closure member alone may be used to secure the plates to the sealing membrane. The closure member may be of any suitable form or construction.

In some embodiments, closure and pre-tension in the axial split line may be provided by bolts. For example, the closure member may include one or more flange secured to each of the retaining members, each flange configured to receive one or a plurality of bolts for securing the retaining members together. In use, the bolts may be configured for manual tightening. Alternatively, the bolts may be configurable so as to be tightened using a bolt tensioner, locally or remotely operated.

Alternatively, or additionally, the closure member may include a tension member. The tension member may, for example, include one or more pivot arm adapted for location between the plates of the retaining member. The, or each, tension member may be rotationally mounted to one of the retaining members and configurable to engage the other of the retaining members to secure the retaining members together.

In a preferred embodiment, the tension members may be square or rectangular in section. Beneficially, the use of square or rectangular section tension members provides for maximum tensile area adjacent to an interface or split line between the sealing membrane portions.

The apparatus may further include a pipe interface arrangement provided between the sealing membrane and the pipe. The pipe interface arrangement may be of any suitable form for providing sealing engagement between the sealing membrane and the pipe.

The pipe interface arrangement may include an axial face seal. The axial face seal may include one or two seals provided in grooves with the mating surface being smooth. The seals may comprise o-rings seals, although d-seals, copper tube, graphite, or other suitable seals known to the person skilled in the art may be used where appropriate. The seals may comprise compression seals, grout, lips seals and the like.

While conventional seals may generally work well where a pre-tension is provided to maintain closure across all the seals, there remains the possibility of leakage past the seals as a result of bending moments between the internal pressure separation load and the bolt pre-tension or pre-load.

The pipe interface arrangement according to particular embodiments of the present invention may further include a step outboard of each seal which corresponds to an opposing step on the mating face. In use, in the event of separation of the mating faces, the steps will remain engaged, thereby permitting the required extrusion gap to be maintained while preventing leakage past the seals.

In preferred embodiments, the pipe interface arrangement includes inboard and outboard seal elements adapted for location between the sealing membrane and the pipe wall. The seal elements may be of any suitable form or construction. The seal elements may, for example, comprise elastomeric seal elements or compression seals.

The pipe interface arrangement may further include a lock adapted for location between the seal element and the pipe, the lock configured to retain the sealing membrane relative the pipe and to maintain sealing pressure on the seals of the pipe interface arrangement. The lock may be of any suitable form or construction. In particular embodiments, the lock may include inboard and outboard lock elements. The lock elements may include taper locks.

Beneficially, pipe interface arrangements according to embodiments of the present invention remove the need for a secondary bolt tensioning lock as may otherwise be required with conventional arrangements and are therefore particularly advantageous in subsea deployments.

It has been discovered that one failure mode for traditional clamps is the effect of temperature on elastomeric seals. In particular, it has been found that relatively high temperatures cause the seal elements to expand and extrude into design clearances. When the temperature lowers again, however, the seal may not recover fully resulting a leak path for fluid.

The pipe interface arrangement according to particular embodiments of the present invention may further include a resilient member adapted for location between the seal elements. In use, the resilient member is adapted to maintain a load force on the seals while permitting temperature induced expansion. The resilient member may include a spring element provided between a seal annulus ring, which location of the spring element in the annulus between the seal elements ensures that it can be kept isolated, for example, from pipeline product and/or seawater. In use, once a clamp installation annulus test is complete, the void may be filled with inert fluid to protect the resilient member.

The apparatus may include a plurality of pipe interface arrangements, for example, located at respective ends of the sealing membrane, thereby providing an isolated region around the pipe.

According to a further aspect of the present invention, there is provided a method of sealing a pipe, the method including the steps of engaging a sealing membrane with a pipe to be sealed and locating first and second retaining members about the sealing membrane. The method further includes the step of providing a closure member for securing the first and second retaining members together to retain sealing engagement between the sealing membrane and the pipe.

Each retaining member may include at least one plate, and in particular embodiments each retaining member may include a plurality of plates.

According to a further aspect of the present invention, there is provided a method of manufacturing a sealing apparatus, the method including the steps of providing a sealing membrane and providing a plurality of retaining members for securing the sealing membrane to a pipe. The method further includes the steps of providing a closure member for securing the first and second retaining members together to retain sealing engagement between the sealing membrane and the pipe.

Each retaining member may include at least one plate, and in particular embodiments, each retaining member may include a plurality of plates.

Further aspects of the present invention are set forth in the independent claims. Further features are described in the dependent claims below. It should be understood that the features defined above in accordance with any aspect of the present invention may be utilised, either alone or in combination with any other defined feature, in any other aspect of the invention.

BRIEF DESCRIPTION OF THE DRAWINGS

These and other aspects of the present invention will now be described, by way of example, with reference to the accompanying drawings, in which.

DETAILED DESCRIPTION OF THE PREFERRED EMBODIMENTS

Figure 1:
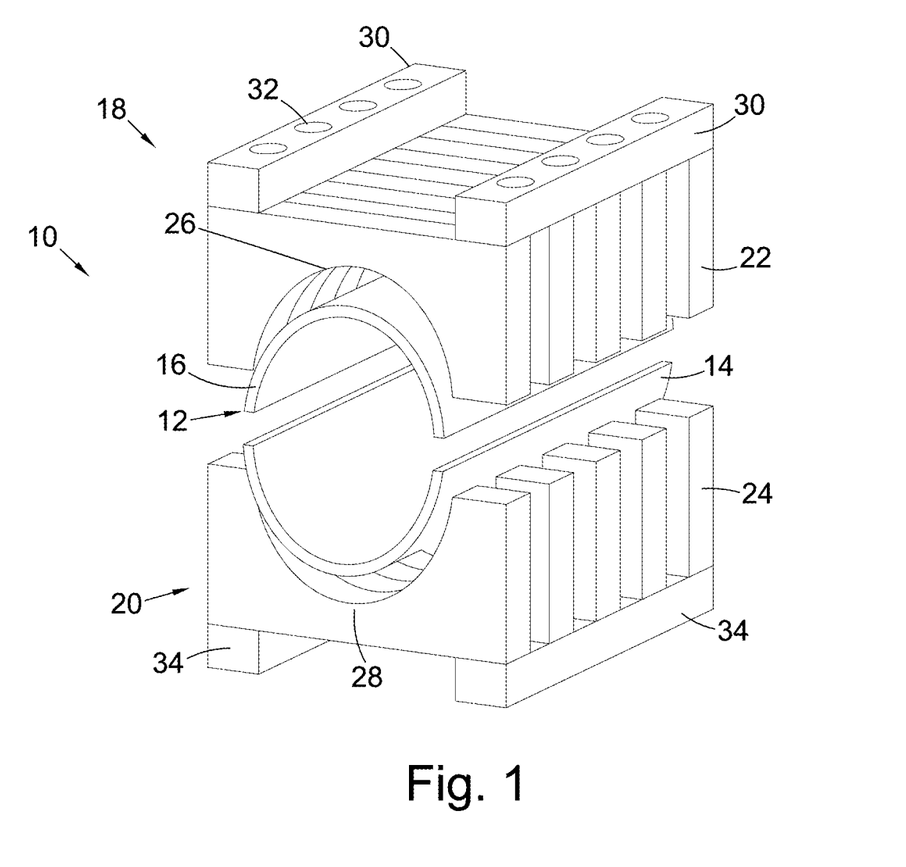
FIG. 1 is a perspective view of a sealing apparatus according to an embodiment of the present invention.

FIG. 1 shows a perspective view of a sealing apparatus according to an embodiment of the present invention. In the embodiment shown, the apparatus takes the form of a subsea repair clamp 10. The clamp 10 includes a sealing membrane in the form of a collar or membrane 12 having first and second hemi-cylindrical portions 14 and 16. It is envisaged that the membrane portions 14 and 16 may be formed from a single section of pipe which has been split or otherwise cut to form the portions 14 and 16, although any suitable methods of construction or manufacture may be employed.

First and second retaining members 18 and 20 are provided in opposing relationship to each other about the membrane 12, each of the retaining members 18 and 20 having a number of axially spaced plates 22 and 24 arranged generally transversely to a longitudinal axis of the respective membrane portions 14 and 16. In the embodiment shown, the first and second retaining members 18 and 20 each have five spaced transverse plates 22 and 24. However, it will be recognized that any number of plates may be used as appropriate.

Each plate 22 and 24 is provided with a semi-circular cut-out 26 and 28 having a diameter corresponding to an outer diameter of the respective membrane portion 14 and 16. In use, the cut-outs 26 and 28 facilitate engagement between the transverse plates 22 and 24 and their respective membrane portions 14 and 16.

As shown in FIG. 1, two flanges 30 extend generally perpendicularly across an upper surface of each transverse plate 22 (that is, the surface facing away from the membrane portion 14) to secure the transverse plates 22 together to form the first retaining member 18 of the clamp 10.

Similarly, two flanges 34 extend generally perpendicularly across a lower surface of each transverse plate 24 (that is, the surface facing away from the membrane portion 16) to secure the transverse plates 24 together to form the second retaining member 20 of the clamp 10.

Each of the flanges 30 and 34 have a number of bores 32 adapted to receive bolts (not shown) to clamp the retaining members 18 and 20 together about the membrane 12 and form a closure arrangement for the clamp 10.

Figure 2:
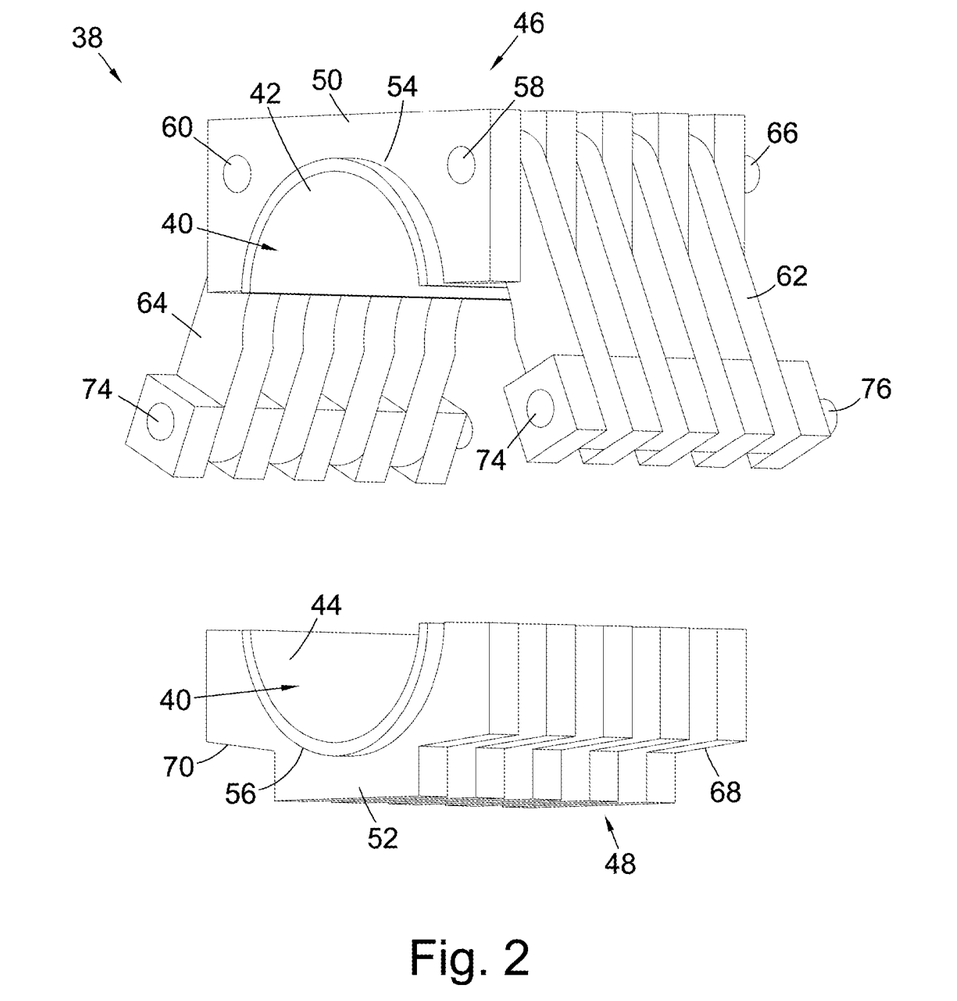
FIG. 2 is a perspective view of a sealing apparatus according to an alternative embodiment of the present invention, shown in an open position.
Figure 3:
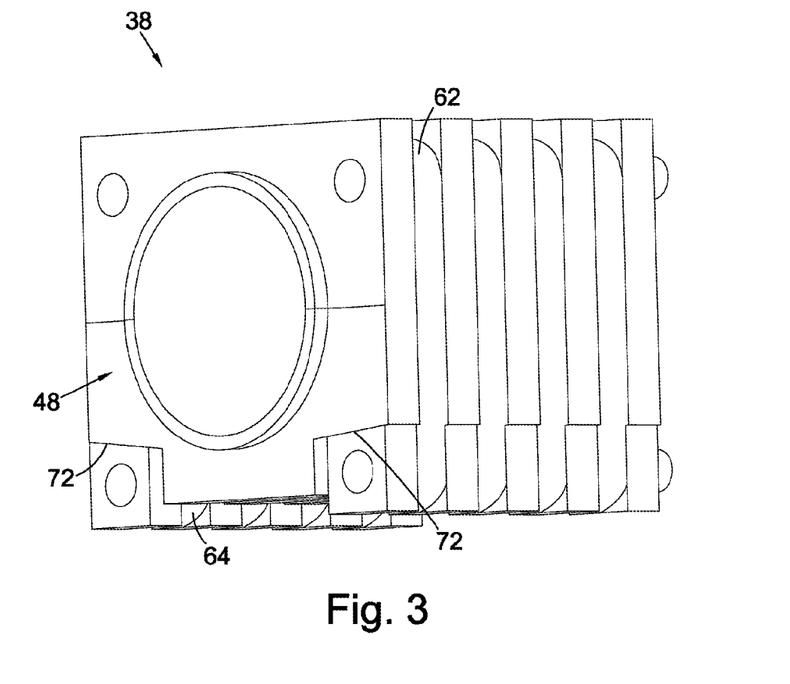
FIG. 3 is a perspective view of the apparatus of FIG. 2, shown in a closed position.

Referring now to FIGS. 2 and 3, there is shown perspective views of a sealing apparatus, in the form of subsea repair clamp 38, according to another embodiment of the present invention. FIG. 2 shows the clamp 38 in an open position, and FIG. 3 shows the clamp 38 in a closed position.

As in the first embodiment, the clamp 38 includes a sealing membrane in the form of a membrane 40 having first and second hemi-cylindrical membrane portions 42 and 44.

Retaining members 46 and 48 are provided in opposing relationship to each other about the membrane 40, each retaining member 46 and 48 having a number of spaced plates 50 and 52 arranged generally transversely to a longitudinal axis of their respective membrane portion 42 and 44. Each transverse plate 50 and 52 is provided with a semi-circular cut-out 54 and 56 having a diameter corresponding to the outer diameter of the membrane portion 42 and 44. In use, the cut-outs 54 and 56 facilitate engagement between the transverse plates 50 and 52 and their respective membrane portions 42 and 44.

In the embodiment shown in FIGS. 2 and 3, the transverse plates 50 of the first retaining member 46 are each provided with two bores 58 and 60, the function of which will be described below.

Pivot arms 62 and 64 are provided on the first retaining member 46, and each pivot arm 62 and 64 is located between a pair of the spaced transverse plates 50.

The transverse plates 50 and 52 and the pivot arms 62 and 64 are rectangular in section where the separation load path is applied. The rectangular section neatly fills the available space between the transverse plates 50 and 52 and so optimizes the load bearing area, this comparing with a round bolt which is limited in diameter to the gap between the plates and the requirements for nut/torque equipment.

Each of the pivot arms 62 and 64 has a bore (not shown) at an upper end which facilitates insertion of a hinge pin 66 through the first retaining member 46 when aligned with the respective bores 58 and 60 in the transverse plates 50. It will be recognized that one hinge pin 66 is provided to secure the pivot arms 62 to the transverse plates 50. Another hinge pin (not shown) is provided to secure the pivot arms 64 to the transverse plates 52.

The distal end of each pivot arm 62 and 64 is also provided with a bore 74 through which hinge pins 76 are located, permitting synchronous movement of each of the pivot arms 62 and 64.

In use, the hinge pins 66 provide operational pinions permitting the arms 62 and 64 to pivot relative to the retaining member 46. The pivot arms 62 are thus able to rotate about one of the hinge pins 66 to engage a first recess portion 68 of the second retaining member 48. The pivot arms 64 are able to rotate about the other of the hinge pins 66 to engage a second recess portion 70 of the second retaining member 48. In this way, the pivot arms 62 and 64 form the closure arrangement for the clamp 38.

As shown most clearly in FIG. 2, connection between the pivot arms 62 and 64 and the lower retaining member 48 is in the form of a taper wedge lock 72. The lock 72 takes the form of a boss portion provided on the distal end of each of the pivot arms 62 and 64 and uses the mechanical advantage of a slight angle in a taper wedge to minimize the external force required to apply closure pre-tension to the clamp 38. This load could be applied with bolting from the sides of the plates 50 and 52 or externally by an external deployment frame (not shown). In some embodiments, the taper interface may be machined with a high friction or buttress tooth profile such that the closure will be self-locking. Accordingly, where a deployment frame is used, the frame would only be required to provide a compressive force, for example, with a hydraulic cylinder, to pivot the arms 62 and 64.

It will be recognized that the simplicity of this mechanism compared to torquing or tensioning bolts offers significant cost and time savings, in particular in the subsea environment which requires the use of remotely operated equipment such as ROV's. In addition, the deployment frame used to engage the clamp 38 is recoverable and can be re-used, in contrast to conventional sacrificial mechanisms.

Figure 4:
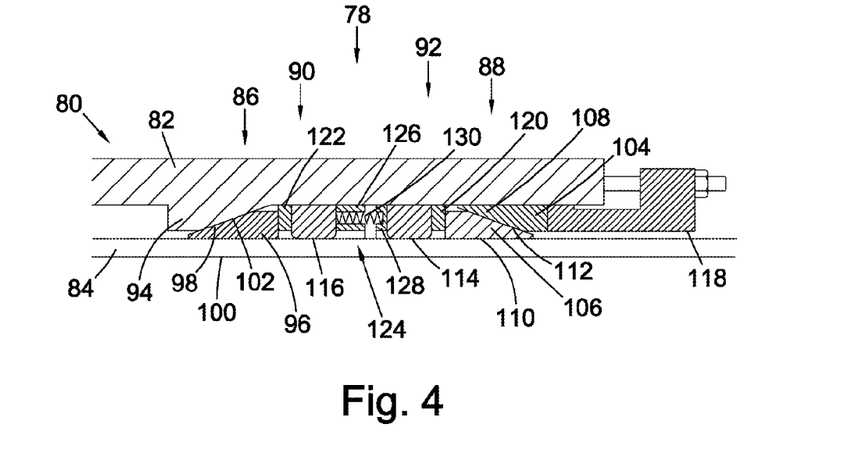
FIG. 4 is a diagrammatic sectional view of a pipe interface arrangement according to an embodiment of the present invention.

Referring to FIG. 4, there is shown a diagrammatic sectional view of a pipe interface arrangement 78 for securing and sealing a clamp 80, specifically a clamp membrane 82, to a pipe 84 in accordance with an embodiment of the present invention, although the arrangement 78 may equally be used for securing and sealing the membrane 12 shown in FIG. 1 or the membrane 40 shown in FIGS. 2 and 3. Only one end of the membrane 82 is shown in the figure. However, it will be recognized that a corresponding interface arrangement may also be provided at the other end of the membrane 82 so as to provide an isolated, sealed region about the pipe 84.

The pipe interface arrangement 78 includes inboard and outboard taper locks 86 and 88, respectively, with seal assemblies 90 and 92 positioned there between. In use, the inboard lock 86 (towards the clamp center) grips the pipe 84 and prevents movement of the pipe 84 towards the center of the clamp 80 (left as shown in FIG. 4). The inboard lock 86 thus prevents the pipe 84 from failing in compression inside the clamp 80.

In this embodiment, the lock bowl 94 of the inboard lock 86 is integral to the membrane 82 and, in use, the inboard lock segments 96 are forced down the conical ramp 98 to contact the pipe 84. The bore of the inboard lock segments 96 has/have a tooth profile 100 which beds into the pipe 84 at the interface there between. The lock segments 96 may also have a tooth profile 102 for gripping the ramp 98.

The outboard lock 88 has the tapered bowl 104 which tapers in the opposite direction to that of the inboard lock 86, preventing the pipe 84 from exiting the clamp 80. In use, the outboard lock segments 106 are forced down the conical ramp 108 to contact the pipe 84. As with the first lock 86, the bore of the outboard lock segments 106 has/have a tooth profile 110 which beds into the pipe 84 at the interface there between. The lock segments 106 may also have a tooth profile 112 for gripping the ramp 108.

Although the inboard lock bowl 92 is shown as fixed, hydraulic operation could alternatively allow the outboard lock bowl 104 to be fixed.

One benefit of this system is that the volume between the locks 86 and 88 is fixed, so that loads generated by seal pressure act on both lock segments 96 and 106 in a manner to further energize their grip. Thus, once the locks 86 and 88 are activated, they not only provide dual directional axial restraint, but also maintain the load on the compression seal, thereby maintaining seal pressure.

This restraint is fixed and independent of the actuation system once the locks 86 and 88 are energized. This offers the potential for hydraulic pistons to be used for setting the seals and locks where the hydraulic pressure can be removed and disconnected without loss of actuation load on the seals and locks. The compressive force required to set the locks and seals could also be beneficially supplied by an external installation tool which would not require hydraulic disconnection.

Referring now to the seal assemblies 90 and 92, compression seals 114 and 116 are provided which are axially compressed by applying axial load via a compression flange 118. This axial load moves a compression ring 120 associated with the first seal 114 towards a second compression ring 122 associated with the second seal 116, the axial compression causing the radial expansion due to the maintenance of seal volume of the seals 114 and 116 towards the pipe, this radial contraction generating a seal against the pipe 84.

The seals 114 and 116 are separated by a spring assembly 124, although where elastomeric seals are used within limited temperature range, this can be a single plate with the compression load being maintained by the elastomeric properties of the seal. If non elastomeric seals are used, for example, graphite or PTFE seals, the spring assembly 124 will maintain a compression load on the seals 114 and 116 for the life of the clamp 82. The spring assembly 124 will also accommodate elastomer volume change due to temperature fluctuation.

The spring assembly 124 includes two rings 126 and 128 with one or more spring elements 130 separating these. In the embodiment shown, the spring elements 130 include an array of wire coil springs with counter bores on the plates for location, although it will be recognized that any suitable spring element such as compression springs, spring washers, gas springs, and compressed elastomer may be used where appropriate. The volume between the seals 114 and 116 offers a sealed test boundary for clamp assembly, which can be filled with inert fluid after the clamp 82 is assembled for preservation of the spring elements 130.

In use, once the seals 114 and 116 are energized, the outboard lock 88 is set. The outboard lock bowl 104 is driven axially by compression flange 118, this axial movement driving lock segments outboard lock segments radially inward to grip the pipe 84. Once engaged, this clamp 82 prevents the pipe 84 from exiting the clamp 80 with any outward axial load being converted to radial force. This radial force further energizes the grip of the locks 86 and 88 to the pipe 84. A by-product of this restraint is that the compression ring is axially retained by the lock.

With the compression ring 122 being supported by inboard lock 86 and compression ring 120 being supported by outboard lock 88, the seal volume is restricted. With a pre-load in a restricted volume, the seal pre-load is maintained. The seal pre-load also maintains the pre-load on both locks 86 and 88. As a result, the compression load provided by the compression flange 118 is thereafter not required to be maintained after initial activation. This allows the compression flange 118 to be hydraulically actuated with no requirement to mechanically retain the stroke as in normal stud tensioner operation.

In other embodiments, the compression flange 118 could also be mounted on a deployment frame (not shown) and not retained on the clamp 84 at all, such that no bolts are required. This would allow the compression flange 118 to be retracted after setting and recovered with the deployment frame.

Embodiments of the present invention thus provide repair clamps adapted for location about a section of a pipe, for example, a damaged section of pipe or pipe section having a defect or penetration. The pipe interface offers both sealing and structural grip of the pipe and is capable of withstanding tensile and/or compressive forces generated by expansion and contraction of the pipe which may otherwise result in the loss of sealing integrity between the sealing membrane and the pipe. Embodiments of the present invention also obviate the requirement for structural welding, reducing lead times.

Other advantages of this design are that only the membrane of the body sees product. Thus, the transverse plates and pivot arms can be constructed from materials independent of pipeline fluid compatibility.

It should be understood that the embodiments described herein are merely exemplary and that various modifications may be made thereto without departing from the scope of the invention.

For example, it will be understood that reference to the term pipe includes any elongate construction including, for example, but not exclusively, an oil or gas pipeline, whether subsea, above or below ground, downhole tubing, or indeed any other conduit suitable for transport or storage of fluids.

It will be recognized that all locks, rings and compression flanges may include a number of split rings to allow fitting around the pipe.

Although the described embodiment of the clamp design uses a wedge taper to apply the closure load, it can be seen that any other mechanical, hydraulic, pneumatic or electrical system could be used to apply the closure load-including threaded tooling, cams, induction a magnetic.

While the described embodiments make use of a separate sealing membrane, in some embodiments, the assembly could be mounted directly on the pipe with the pipe effectively being the membrane.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A sealing apparatus for use in sealing a pipe, the sealing apparatus comprising:
    a sealing membrane adapted to engage a pipe;
    first and second retaining members configured for location about the sealing membrane, wherein each of the first and second retaining members comprise a plurality of plates; and
    a closure member arrangement for securing the first and second retaining members together to retain sealing engagement between the sealing membrane and the pipe, wherein said closure member arrangement of said sealing apparatus comprises a plurality of tension members, said tension members comprising pivot arms adapted for location between the plates of the first and second retaining members, said pivot arms being rotationally mounted to the first retaining member and configurable to pivot relative to the first retaining member to engage the second retaining member to secure the retaining members together, wherein a distal end of each of said pivot arms comprises a boss portion which axially overlaps a plate of said second retaining member on engagement between said first and second retaining members, said boss portion defining part of a taper wedge connection between said pivot arm and the second retaining member.

2. The sealing apparatus of claim 1, wherein the first and second retaining members are configured for location about the sealing membrane in opposing relationship to each other.

3. The sealing apparatus of claim 1, wherein the sealing membrane is configured to resist axial loads applied to the sealing membrane.

4. The sealing apparatus of claim 1, wherein the first and second retaining members are configured to resist radial loads applied to the sealing membrane.

5. The sealing apparatus of claim 1, wherein the first and second retaining members are secured to the sealing membrane.

6. The sealing apparatus of claim 1, wherein the plates are arranged in a substantially transverse or perpendicular direction with respect to a longitudinal axis of the sealing membrane.

7. The sealing apparatus of claim 1, wherein the closure member arrangement comprises at least one flange secured to each of the first and second retaining members, each of the at least one flange configured to receive one or a plurality of bolts for securing the first and second retaining members together.

8. The sealing apparatus of claim 1, further comprising a pipe interface arrangement provided between the sealing membrane and the pipe.

9. The sealing apparatus of claim 8, wherein the pipe interface arrangement comprises at least one seal element adapted for location between the sealing membrane and the pipe wall.

10. The sealing apparatus of claim 9, wherein the at least one seal element comprises at least one of:
    at least one elastomeric seal element adapted for location between the sealing membrane and the pipe wall;
    at least one compression seal element adapted for location between the sealing membrane and the pipe wall; and
    inboard and outboard seal elements adapted for location between the sealing membrane and the pipe wall.

11. The sealing apparatus of claim 8, wherein one of:
    the pipe interface arrangement further comprises a lock configured to retain the sealing membrane relative to the pipe, and
    the pipe interface arrangement further comprises a taper lock configured to retain the sealing membrane relative to the pipe.

12. The sealing apparatus of claim 8, wherein one of:
    the pipe interface arrangement further comprises a resilient member, and
    the pipe interface arrangement further comprises a resilient member comprising a spring.

13. The sealing apparatus of claim 1, wherein the tension members are square or rectangular in section.

14. The sealing apparatus of claim 1, wherein at least one of:
    the sealing membrane comprises a split collar having first and second membrane portions;
    the sealing membrane is shaped to facilitate engagement with the pipe;
    the sealing membrane is comprised of a material capable of facilitating sealing engagement with the pipe; and
    the sealing membrane comprises at least one of: a metallic material, a metal alloy, a non-metallic material, a plastic material, a polymeric material, a ceramic material and a composite material.

15. The sealing apparatus of claim 1, wherein at least one of:
    each plate is formed so as to directly engage with the sealing membrane; and
    each plate comprises a cut-out portion having an inner dimension corresponding to an outer dimension of the sealing membrane.

16. The sealing apparatus of claim 1, wherein one of:
    the sealing apparatus comprises a plurality of pipe interface arrangements; and
    the sealing apparatus comprises a plurality of pipe interface arrangements, at least one pipe interface arrangement being provided at each end of the sealing membrane.

17. The sealing apparatus of claim 1, wherein a pair of said pivot arms is adapted to be rotationally mounted between said plurality of plates.

18. A method of sealing a pipe, the method comprising the steps of:
providing a sealing membrane;
engaging the sealing membrane with a pipe to be sealed;
locating first and second retaining members about the sealing membrane, wherein each of the first and second retaining members comprise a plurality of plates; and
providing a closure member arrangement for securing the first and second retaining members together to retain sealing engagement between the sealing membrane and the pipe, wherein said closure member arrangement of said sealing apparatus comprises a plurality of tension members, said tension members comprising pivot arms adapted for location between the plates of said first and second retaining members, said pivot arms being rotationally mounted to the first retaining member and configurable to engage the second retaining member to secure the first retaining member and the second retaining member together, and
pivoting said pivot arms relative to said first retaining member to engage the second retaining member and secure the first and second retaining members together, wherein a distal end of each of said pivot arms comprises a boss portion which axially overlaps a plate of said second retaining member on engagement between said first and second retaining members, said boss portion defining part of a taper wedge connection between said pivot arm and the second retaining member.

19. A method of manufacturing a sealing apparatus, the method comprising the steps of:
providing a sealing membrane;
providing a plurality of plates and arranging the plurality of plates to form first and second retaining members for securing the sealing membrane to a pipe, wherein each of the first and second retaining members comprises a plurality of the plates;
providing a closure member arrangement for securing the first and second retaining members together to retain sealing engagement between the sealing membrane and the pipe, wherein said closure member arrangement of said sealing apparatus comprises a plurality of tension members, said tension members comprising pivot arms adapted for location between said plates of said first and second retaining members, said pivot arms being rotationally mounted to the first retaining member and configurable to engage the second retaining member to secure the first retaining member and the second retaining member together; and
providing a distal end of each of said pivot arms with a boss portion which axially overlaps a plate of said second retaining member on engagement between said first and second retaining members, said boss portion defining part of a taper wedge connection between said pivot arm and said second retaining member.

20. A sealing apparatus for use in sealing a pipe, the apparatus comprising:
a sealing membrane adapted to engage a pipe;
first and second retaining members configured for location about the sealing membrane;
a closure member arrangement for securing the first and second retaining members together to retain sealing engagement between the sealing membrane and the pipe; and
a pipe interface arrangement provided between the sealing membrane and the pipe, said pipe interface arrangement being provided on an inner surface of the sealing membrane, wherein said pipe interface arrangement comprises at least one seal element and lock, the seal element adapted for location between the sealing membrane and the pipe wall and the lock configured to retain the sealing membrane relative to the pipe.

21. A sealing apparatus for use in sealing a pipe, the apparatus comprising:
a sealing membrane adapted to engage a pipe, said sealing membrane comprising a split collar comprising a first sealing membrane portion and a separate second sealing member portion;
first and second retaining members configured for location about the sealing membrane, wherein each of the first and second retaining members comprises a plurality of plates; and
a closure member arrangement for securing the first and second retaining members together to retain sealing engagement between the sealing membrane and the pipe, said closure member arrangement of said sealing apparatus comprising a plurality of tension members, said tension members comprising pivot arms adapted for location between the plates of the first and second retaining members, said pivot arms being rotationally mounted to the first retaining member and configurable to engage the second retaining member to secure the first and second retaining members together,
wherein said first sealing membrane portion, said first retaining member and said pivot arms define a first module of said sealing apparatus and said second sealing membrane portion and said second retaining member comprise a second module of said sealing apparatus, said second module being separate from said first module, wherein said first and second modules of said sealing apparatus are independently disposable about the pipe, said pivot arms being rotationally mounted to the first retaining member and configurable to engage the second retaining member to secure the first and second retaining members together.

* * * * *